United States Patent [19]

Damrath et al.

[11] Patent Number: 4,861,831

[45] Date of Patent: Aug. 29, 1989

[54] PARTICULATE MULTIPHASE POLYMERS

[75] Inventors: Volker Damrath, Burscheid; Christian Lindner, Cologne, both of Fed. Rep. of Germany; Hans-Jürgen Kress, Pittsburgh, Pa.; Dieter Wittmann, Krefeld, Fed. Rep. of Germany

[73] Assignee: Bayer Aktiengesellschaft, Leverkusen, Fed. Rep. of Germany

[21] Appl. No.: 154,849

[22] Filed: Feb. 10, 1988

[30] Foreign Application Priority Data

Feb. 14, 1987 [DE] Fed. Rep. of Germany ....... 3704655

[51] Int. Cl.$^4$ .................... C08F 8/00; C08L 83/04
[52] U.S. Cl. .................... 525/100; 525/102; 525/104; 525/105; 525/106; 525/288; 525/902
[58] Field of Search ............. 525/102, 106, 104, 105, 525/902, 288, 100; 523/201

[56] References Cited

U.S. PATENT DOCUMENTS

| | | | |
|---|---|---|---|
| 3,686,356 | 8/1972 | Saam | 525/102 |
| 3,691,257 | 9/1972 | Kendrick et al. | 525/106 |
| 3,808,180 | 4/1974 | Owens | 525/293 |
| 4,276,389 | 6/1981 | Wieder et al. | 525/100 |

Primary Examiner—John C. Bleutge
Assistant Examiner—Ralph H. Dean, Jr.
Attorney, Agent, or Firm—Connolly and Hutz

[57] ABSTRACT

Particulate, multiphase polymers which have a core (A) and an overlying shell (B) wherein the core (A) is an organic, resinous polymer comprising polymerized olefinically unsaturated monomer units having softening point temperatures of at least 30° C. and wherein the shell (B) is an organopolysiloxane are obtained by producing in a first stage an organic resinous polymer in latex form by emulsion polymerization and, in a second stage, the latex particles of the first stage are surrounded with a shell (B) organopolysiloxane by polymerizing low molecular weight organosiloxanes in the presence of the latex particles of the first stage.

4 Claims, No Drawings

PARTICULATE MULTIPHASE POLYMERS

This invention relates to particulate emulsified multiphase polymers having a core-shell structure and to a process for their preparation. The polymer has an organic, resinous polymer as its core and a shell of organopolysiloxane.

BACKGROUND OF THE INVENTION

Multiphase polymers of this type of core/shell structure may be used as coating and impregnating materials and possibly also as raw materials for rubber.

The properties of organic resinous polymers composed of at least one olefinically unsaturated, polymerizable monomer are unsatisfactory for many fields of application. Their main disadvantages lie in their high and low temperature characteristics and their tendency to become brittle even at room temperature.

Organopolysiloxanes are distinguished by high thermal stability and resistance to the cold. They are also corrosion resistant and water repellent.

BRIEF DESCRIPTION OF THE INVENTION

It has now been found that emulsified, particulate, high cross-linked, partially cross-linked or uncross-linked organic, resinous polymers can be enveloped in organopolysiloxanes to form core-shell particles. It has further been found that such multiphase polymers have particularly advantageous properties as coating and impregnating materials and may be used as rubber raw materials. Thus, the present invention relates to particulate, emulsified multiphase polymers comprising a core (A) which is an organic, resinous polymer based on olefinically unsaturated, polymerizable monomers and a shell (B) which is a homo- or copolymer or organosiloxane.

DETAILED DESCRIPTION OF THE INVENTION

The present invention relates to particulate multiphase polymers which have a core (A) and an overlying shell (B) wherein the core (A) is an organic, resinous polymer comprising polymerized olefinically unsaturated monomer units having softening point temperatures of at least 30° C. and wherein the shell (B) is an organopolysiloxane.

The invention also relates to a process for the production of the particulate multiphase polymers which comprises producing, in a first stage and organic, resinous polymer in latex form by emulsion polymerization and, in a second stage, the latex particles of the first stage are surrounded with a shell (B) of organopolysiloxane by polymerizing low molecular weight organosiloxanes in the presence of the latex particles of the first stage.

The ratio by weight of the core (A) to the shell (B) may vary from 0.1:99.9 to 90:10 and is preferably in the region of 10:90 to 50:50. The multiphase polymers according to the invention have average particle diameters (d$_{50}$) of from 0.05 to 10 μm, preferably from 0.1 to 2 μm. Particularly preferred particle diameters are from 0.1 to 1 μm.

The cores (A) of the present invention, are organic, resinous polymers having softening temperatures (glass temperatures) of at least 30° C., in particular above 60° C. and especially above 90° C. and have average particle diameters (d$_{50}$) of from 0.05 to 2 μm, in particular from 0.09 to 0.5 μm. They may be uncross-linked polymers, partially cross-linked polymers or highly cross-linked polymers. Particles of uncross-linked polymers are preferred. The material of the core (A) is a resinous homopolymer or interpolymer of at least one olefinically unsaturated, polymerizable monomer, in particular from the series of styrenes, α-methylstyrenes, acrylonitrile, methacrylonitrile, alkylmethacrylates, maleic acid imides, vinyl esters of C$_{1-6}$ carboxylic acids, olefins, in particular ethylene, vinyl chloride, vinylidene chloride, acrylic acid, methacrylic acid and acrylamide. If required, the polymers may also contain small quantities (up to 10% by weight) of monomers such as butadiene, isoprene, alkyl acrylates or maleic acid esters. Particularly suitable materials for the core are copolymers based on styrene, α-methylstyrene, methylmethacrylate and acrylonitrile, in particular styrene-acrylonitrile copolymers, α-methylstyreneacrylonitrile copolymers, styrene-methylmethacrylate copolymers and polymethylmethacrylate.

The material of the shell (B) is a homopolymer or interpolymer of organosiloxanes substantially built up of units corresponding to the following general formula

$$R_n SiO_{\frac{4-n}{2}} \tag{I}$$

wherein R denotes a monobasic organic group and n has an average value of from 1 to less than 3.

R represents a monovalent, saturated hydrocarbon group having 1 to 18 alkyl carbon atoms, e.g. methyl or ethyl, or R may be an aryl having 6 to 12 carbon atoms, such as for example, phenyl. R may also represent a monovalent hydrocarbon group which can be attacked by a radical, in particular, for example, vinyl, allyl, chloroalkyl, mercaptoalkyl or acryloxypropyl. Preferably at least 80% of all the groups represented by R are methyl groups.

The present invention further relates to a process for the preparation of the multiphase polymers according to the invention.

In a first stage, an emulsion of the material of the core (A) is prepared;

The preparation is carried out by known processes of dispersion polymerization of at least one monomer, in particular by aqueous, radical emulsion polymerization. In this process, monomers are polymerized in emulsion in the presence of surface-active agents and optionally initiators. The particle size of the polymers can be controlled and adjusted to the desired value by varying the polymerization conditions. Emulsion polymerizations are normally carried out at temperatures of from 30° to 100° C. Preferred emulsions containing the cores (A) for the purpose of this invention have a pH below 7 and are prepared by means of anionic emulsifiers, in particular emulsifiers based on salts of sulphonic acids or organic sulphates. The particle size of the latices obtained may be controlled by adjusting the monomer/emulsifier/water ratios to particular values. If the cores in the context of the present invention are at least partially cross-linked, then the monomers which form the core are polymerised in the presence of at least one polyfunctional vinyl monomer or allyl monomer, in particular in quantities of up to 5% by weight, based on the monomers. Cross-linking, polyfunctional monomers of this type are widely known; divinylbenzene, bis-acrylates, bis-acrylamides and acrylic acid vinyl esters and triallyl-cyanurate, -isocyanurate, -phosphate, -citrate, etc. are preferred.

In the second stage of the process according to the invention, the organopolysiloxane for the shell (B) is prepared by emulsion polymerization in the presence of the polymer emulsion of the first stage by dispersing low molecular weight organosiloxanes in the latex from stage 1 and polymerizing (optionally in the presence of the quantity of emulsifier required for obtaining a stable emulsion and a catalyst). In this process, it is not necessary to emulsify the coarsely dispersed organo siloxanes with the aid of technical apparatus such as high speed stirrers (Ultraturrax), colloid mills or high pressure homogenizers before polymerization is carried out. Indeed, emulsification and polymerization are preferably carried out simultaneously. The surprising result is then achieved that the organopolysiloxane obtained according to the invention polymerizes on the core material (A) prepared in the first stage.

The reaction temperature may be raised to about 40°–100° C. to increase the polymerization velocity.

The particle sizes of the multiphase polymers according to the invention may be controlled by variation of the polymerization conditions and adjusted to the desired values. Particularly advantageous control of the particle sizes of the multiphase polymers is obtained by using non-ionic coemulsifiers and adjusting the emulsifier/organosiloxane ratios to particular values as well as by using core materials with suitable particle diameters.

When polymerization has been completed, the particulate multiphase polymer may be obtained in a modified form by breaking of the emulsion by any desired method, e.g. by the addition of salts such as sodium chloride, by evaporation of the water or by the addition of water-soluble alcohols such as methanol, ethanol or isopropanol. If breaking of the emulsion is carried out by the addition of salts of alcohols, the multiphase polymer is obtained virtually free from catalyst, although the multiphase polymer may be worked up in emulsion if desired.

The organosilicon compounds used as starting materials may be those already known in the art. These include inter alia cyclic organosiloxane oligomers, e.g. octamethylcyclotetrasiloxane or decamethylcyclopentasiloxane. Alkoxysilanes and alkoxysiloxanes in which the alkoxy group has 1 to 4 carbon atoms are also suitable. Example of suitable alkoxysilanes include methyl triethoxysilane, 3-aminopropyltrimethoxysilane and 3-mercaptopropylmethyldimethoxysilane.

Polysiloxanes are also suitable for the process according to the invention, in particular α,ω-polysiloxanediols having a molecular weight of about 2000 to 5000 and a viscosity of from 50 to 150 mPa.s at 25° C.

The organopolysiloxane of the shell (B) may be partly cross-linked. Branching or cross-linking may be incorporated by the addition of, for example, tetraethoxysilane or a silane of the general formula $$RSiX_3 \tag{II},$$

wherein X denotes a hydrolyzable group, in particular the alkoxy group, and R has the meaning already described above. Preferably, R is methyl or R is phenyl. Cross-linking may also occur when, for example, vinyl groups and mercapto groups put into the process together react with each other during emulsion polymerization of the siloxane constituents, in which case the addition of an external cross-linking agent is not necessary. The organopolysiloxanes of the shell (B) may in addition contain inorganic fillers, e.g. $SiO_2$, talc and the like.

The emulsifiers used may be the non-ionogenic and/or anionic-active emulsifiers known in the art.

Examples of the non-ionogenic emulsifiers include products of addition of ethyl oxide to compounds containing acidic hydrogen, such as fatty alcohols, fatty acids and the like. The HLB value of the emulsifiers should be chosen to lie in the range in which the formation of O/W emulsions is promoted. Emulsifiers having a HLB value $\geq 10$ are generally used. Suitable non-ionogenic emulsifiers include, for example, POE (3)-lauryl alcohol, POE (20)-oleyl alcohol, POE (7)-nonylphenol or POE (10) stearate. "POE (3)-lauryl alcohol" means that 3 units of ethylene oxide have been added to a molecule of lauryl alcohol, the number 3 representing an average value.

The anion-active emulsifiers used may be alkali metal salts of fatty acids or alkali metal, alkaline earth metal or amine salts of organic sulphonic acids, in particular alkylarylsulphonic acids. Examples include the sodium salt of dodecylbenzene sulphonic acid or of lauryl sulphonic acid. Mixtures of non-ionogenic emulsifiers and anion-active emulsifiers may, of course, also be used.

Acids are used as catalysts in accordance with the state of the art. Acids which are interface active are particularly suitable. Examples of such catalysts include sulphonic acids such as alkylsulphonic acids or alkylaryl sulphonic acids, e.g. dodecylbenzene sulphonic acid. Although any acids known in the art may in principle be used as catalysts, interface active acids are preferred.

During polymerization of the shell (B), the formation of new particles should if possible be completely prevented. The emulsion stabilizer must be present in a quantity sufficient to cover the surface of the particles. The size of the particles may be varied within wide limits by controlling the reaction conditions. If an agglomerated latex is used as core (A) in order that large particles may be obtained, then these may contain several resin particles. Polymerization of the shell (B) may be controlled to result in particles having a core-shell structure and at the same time particles of pure organopolysiloxane. Mixtures of this type may also be used in certain circumstances.

The particulate multiphase polymers according to this invention may be used as coating and impregnating materials and as raw materials for rubber.

They are also suitable for the manufacture of latex paints. The emulsion may be mixed, for example, with pigments and/or other fillers and applied to surfaces on which a continuous film is left after evaporation of the water.

The multiphase polymers according to this invention are distinguished by their surprisingly advantageous combination of technically relevant plastics properties and may therefore be used in place of pure organopolysiloxanes. These properties include resistance to ageing and thermostability, low temperature strength, oxidation and corrosion resistance and properties suitable for rubbers, such as high strength, suitable tension-elongation ratios and exceptionally advantageous processing qualities.

The object of the present invention will now be explained more fully with the aid of the following Examples (the parts and percentages refer to weight unless otherwise indicated).

EXAMPLES

1. Preparation of the core of materials (1.1) 3000 Parts of water and 7.5 parts of Na salt of $C_{14-18}$-alkyl sulphonic acids are introduced into a reactor. After heating to 63°–65° C. with stirring, 240 parts of a mixture of styrene and acrylonitrile in ratios by weight of 28% acrylonitrile and 72% styrene are fed into the reactor. After initiation by means of a solution of 15 parts of potassium peroxy disulphate in 150 parts of water, the following solutions are fed into the reactor in the course of 4 hours:

| Solution 1: | 788 Parts of acrylonitrile, |
| | 2025 parts of styrene and |
| | 12 parts of tert.-dodecylmercaptan |
| Solution 2: | 2100 parts of water and |
| | 33 parts of Na—salt of $C_{14-18}$-alkyl sulphonic acid, |

The mixture is then polymerized at 65° C. until the latex has a solids content above 36.5%. The resulting latex has a pH of 3.57 and an average particle size ($d_{50}$-value) of 0.12 μm.

(1.2) 3000 Parts of water and 8 parts by weight of the Na-salt of $C_{14-18}$-alkylsulphonic acids are introduced into a reactor. After heating to 65°–67° C., 240 g of methylmethacrylate are introduced into the reactor. After initiation by means of a solution of 10 parts by weight of potassium peroxodisulphate in 150 parts by weight of water, the following solutions are fed into the reactor in the course of 4 hours:

| Solution 1: | 2025 Parts of methylmethacrylate |
| | 11 parts of tert.-dodecylmercaptan |
| Solution 2: | 2100 parts of water |
| | 30 parts of the Na salt of $C_{14-18}$-alkylsulphonic acids |

The reaction mixture is then polymerized at 65° C. until the latex has a solids content above 36.5%. The resulting latex has a pH of 4 and an average particle side ($d_{50}$-value) of 0.15 μm.

2. Preparation of the multiphase polymers according to the invention (2.1) The following are introduced into a reactor under a nitrogen atmosphere:
150 parts of the resin emulsion (1.1) 5.0 parts of octamethylcyclotetrasiloxane.

The reaction mixture is heated to 85° C. and stirred for 2 hours.

After the addition of a solution of 1.3 parts of dodecylbenzene sulphonic acid in 139 parts of water, the reaction mixture is stirred at 85° C. for one hour and 95 parts of octamethylcyclotetrasiloxane are then fed in over a period of 2 hours.

Polymerization is carried to completion within 24 hours in the initially diphasic reaction mixture while the mixture is stirred and the reaction temperature is maintained. The stable emulsion obtained is cooled to room temperature. It contains the multiphase polymer at a concentration of 36.7% (determined according to DIN 53 216). The particle size is 0.16 μm (determined by Laser Scatterlight spectroscopy) and the particle size distribution is monomodal ($k\,2=0.07$). The polymer has a gel content of 2.0%, determined in tetrahydrofuran, and consists of 34% of styrene-acrylonitrile copolymer and 66% or organopolysiloxane. A tack-free, soft film which has excellent adherence to glass can be obtained from the emulsion by evaporation of the water.

(2.2) The following are introduced into a reactor under a nitrogen atmosphere:
150 parts of the resin emulsion (1.1) 5.0 parts of octamethylcyclotetrasiloxane.

The reaction mixture is heated to 85° C. and stirred for 2 hours.

After the addition of a solution of 1.4 parts of dodecylbenzenesulphonic acid, 1.4 parts of POE(5)-lauryl alcohol and 1.4 parts of the sodium salt of $C_{12-14}$-alkyl sulphonic acid in 58 parts of water, the mixture is stirred for one hour at 85° C. A mixture of 95 parts of octamethylcyclotetrasiloxane, 2.5 parts of mercaptopropylmethyl dimethoxysilane and 3.1 parts of tetramethyltetravinylcyclotetrasiloxane is then introduced over a period of 2 hours, polymerization is continued to completion as in Example 2.1 and the stable emulsion obtained is cooled to room temperature. It contains the multiphase polymer at a concentration of 48.7%. The particle size is 0.18 μm and the particle size distribution is monomodal ($k\,2=0.02$). The polymer is partly crosslinked and the gel content is 58.2%. It consists of 35% of styrene-acrylonitrile copolymer and 65% of organopolysiloxane. A tack-free, stretchable film which has excellent adherence to glass can be obtained from the emulsion by drying.

What is claimed is:

1. Particulate, multiphase polymers which have a core (A) and an overlying shell (B) wherein the core (A) is an organic, resinous polymer comprising polymerized olefinically unsaturated monomer units and having softening point temperatures of at least 30° C. and wherein the shell (B) is an organopolysiloxane.

2. Particulate multiphase polymers as claimed in claim 1, in which the ratio by weight of (A) to (B) is from 0.1:99.9 to 90:10.

3. Particulate multiphase polymers as claimed in claim 1 having average particle diameters of from 0.05 to 10 μm.

4. Particulate multiphase polymers as claimed in claim 1 wherein the cores (A) have an average size of from 0.05 to 2 μm.

* * * * *